June 7, 1955 — C. B. GODWIN — 2,709,929
SINUSOIDAL PLANETARY COUPLING MECHANISM
Filed Jan. 22, 1953 — 6 Sheets-Sheet 1

INVENTOR:
CLIFFORD B. GODWIN,
BY George J. Mager
HIS ATTORNEY United States Patent Office 2,709,929
Patented June 7, 1955

2,709,929

SINUSOIDAL PLANETARY COUPLING MECHANISM

Clifford B. Godwin, Clayton, Mo.

Application January 22, 1953, Serial No. 332,653

4 Claims. (Cl. 74—794)

The present invention pertains to a novel sinusoidal planetary coupling mechanism which includes fabricated gearing disposed within a cylindrical casing about co-axial input and output shafts, and a hydraulic system also within said casing for effecting the transmission of power from the input to the output shaft responsive to the hydrostatic action of the fluid contained in said hydraulic system, in cooperation with said gearing.

More particularly, this invention is directed to the provision of a novel and compact assembly of planetary gearing with which is associated a hydraulic system, the latter being manually controllable to selectively regulate the speed ratios of the output shaft relatively to that of the input shaft. In attaining this end, the mechanism provides a novel grouping of associated elements for achieving the conversion of mechanical motion whereby rotative movement is transformed into straight line reciprocative movement, the latter having sinusoidal characteristics, as will appear.

All of the gearing and associated elements together with the hydraulic system, are enclosed within a sealed cylindrical casing, the control means being disposed extraneously of the casing. The co-axial drive and driven shafts extend into the casing at opposite ends thereof, both of said shafts terminating in splined portions contiguously disposed within said casing on the central axis thereof.

The cylindrical casing is formed of front and rear wall members which are maintained in spaced relation by an annular shell member concentrically disposed between them, with the marginal edges of said shell interfitting with annular shoulders provided therefor respectively on said front and rear walls. A circular series of fastening elements serves to clamp said shell in position between the said walls, so that a peripherally sealed cylindrical casing is thus provided for containing the gearing, the hydrostatically operable elements, and the fluid medium for actuating the latter elements, as will appear.

Means are provided for rotatably supporting the mechanism of the invention interposed between a power source and an ultimate element to be driven. This means may be in the form of a stationary standard, or steady-rest, which includes a hollow hub portion projecting centrally into the casing through the rear wall thereof. Means are provided for effectively sealing the casing about the opening through which said hub projects.

Cooperatively associated with and adjustably mounted in said hub portion of the supporting standard, is the sleeve section of a manually rotatable member by means of which the action of the hydraulic system may be controlled.

The hydraulic system includes, in addition to the control means: a pair of circular non-articulating members which will hereinafter be termed monocoque ribs; a pair of articulating members which will hereinafter be termed shuttle monitors; a series of positive check valves mounted in the contiguously disposed monocoque ribs; passageways in said ribs and in the rear wall of the casing for circulating the hydraulic fluid through said valves; and pistons on the shuttle monitors for effecting the circulation of the fluid as said monitors are actuated responsive to the movements of the planetary gearing.

The primary object of the invention therefore, is to provide means for the conversion of rotary motion into reciprocatory sinusoidal motion, and to provide planetary means inter-related with the first named means for integrating said conversion of motion so as to produce a resultant utility factor in a sinusoidal planetary coupling mechanism which is adapted to be interposed and supported between a power source and an element to be driven, whereby said mechanism may selectively be employed in a clutch, coupling, or speed reducer capacity.

Another object of the invention is to provide a mechanism of this character in which the cooperation and relative interaction between a fabricated gearing system and a hydraulic fluid system may be utilized to effectively cause said mechanism to function selectively in any of the capacities recited in the immediately preceding paragraph.

A further object of the invention is to provide a mechanism of this character wherein clutching operations are hydrostatically effected without the use of clutch plates, thus insuring smooth and quiet clutch engagement and dis-engagement.

Another object is to provide a mechanism of this type in the form of a self-contained unit, rotatably supported intermediate but independently of the drive and driven shafts.

Further objects of the invention include the provision of means for automatically lubricating the operating parts of the mechanism which are disposed within said self-contained unit; and the provision of means for maintaining said parts in operative disposition in such manner as to reduce end play in the mechanism to a minimum.

There are other objects and advantages which the invention provides, as will appear hereinafter.

A more comprehensive understanding of the invention and its mode of operation may be had from the detailed description and explanation thereof to follow with reference to the accompanying drawings. In the interest of clarity, the relative disposition of the elements included in the mechanism will be described in accordance with their portrayal in the various views of the drawings. Further, the input section will be considered the front, and output section will be considered the rear portion of the mechanism.

In Figures 1 through 7, the mechanism comprising the instant invention is designated as a whole by the numeral 24, and includes a circular casing generally designated 26 which is rotatably mounted and supported adjacent the upper end of a vertical standard generally indicated 28.

Figures 1, 7, 9:
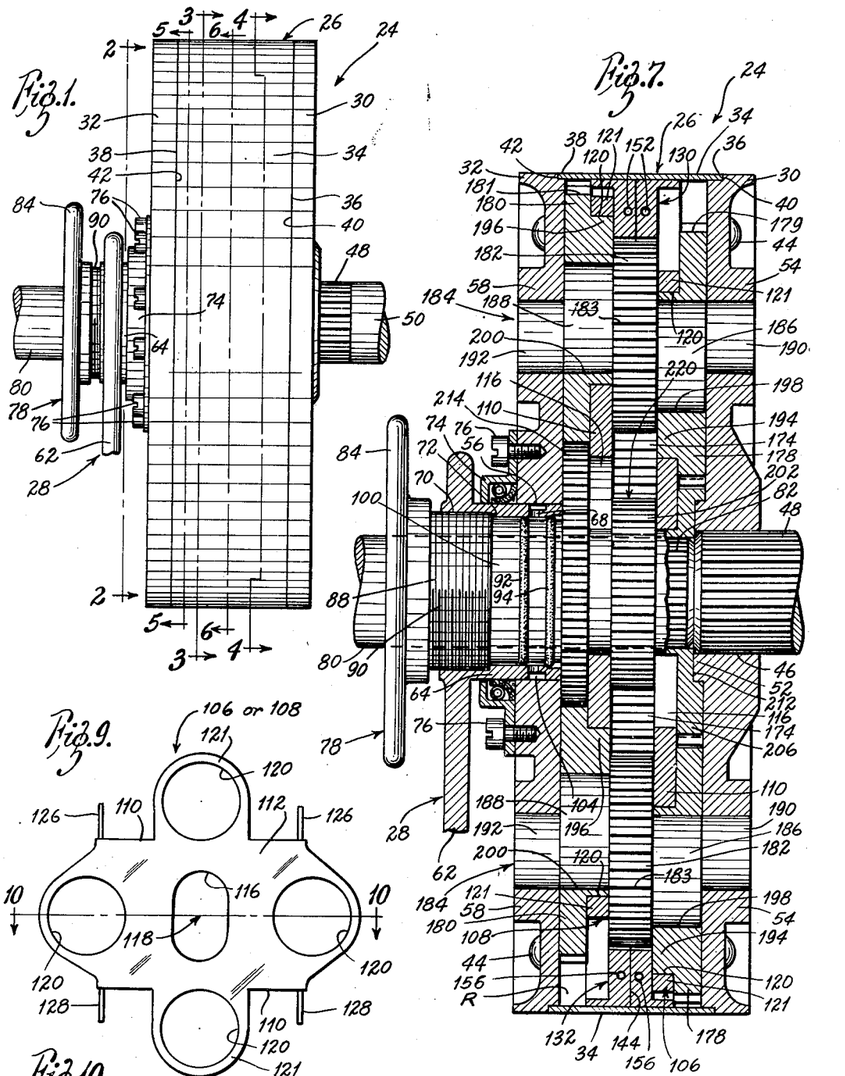
Figure 1 is a side elevational view of a sinusoidal planetary coupling mechanism incorporating the principles of the present invention.
Figure 7 is a vertical sectional view on an enlarged scale and taken axially of the machanism, certain elements being illustrated in a moved position relative to the position they occupy in Figures 1 through 6.
Figure 9 is an elevational view of a shuttle monitor, the planar face thereof being presented.

The casing 26 includes a circular front wall 30, a similar rear wall 32, and a cylindrical shell 34 interposed between said walls, the annular marginal edges 36 and 38 of said shell abutting against shoulders 40 and 42 formed respectively in the front and rear walls, as clearly shown in Figure 7. A circular series of fastening elements 44 serves to clamp the shell 34 between the walls aforesaid, thus sealing the casing peripherally.

Centrally thereof, the front wall 30 has formed therein a splined opening 46 in engagement with the splined end 48 of a drive or input shaft 50, the latter being energizable by any suitable power means, as is understood. Projecting into the interior of casing 26 from the inner face of the wall 30 is a bearing boss 52, the purpose of which will appear, and a series of four bearings 54, evenly spaced along an imaginary circle concentric with the shaft 50, is formed in said wall as shown.

Centrally thereof, the rear wall 32 has formed therein a circular opening 56, and on an imaginary circle concentric with said opening and therefore with the shaft 50, said wall has formed therein a series of four bearings 58 which, as Figure 7 clearly demonstrates, are in alignment with the bearings 54 of the front wall 30.

Figures 2, 3, 15, 16, 17:
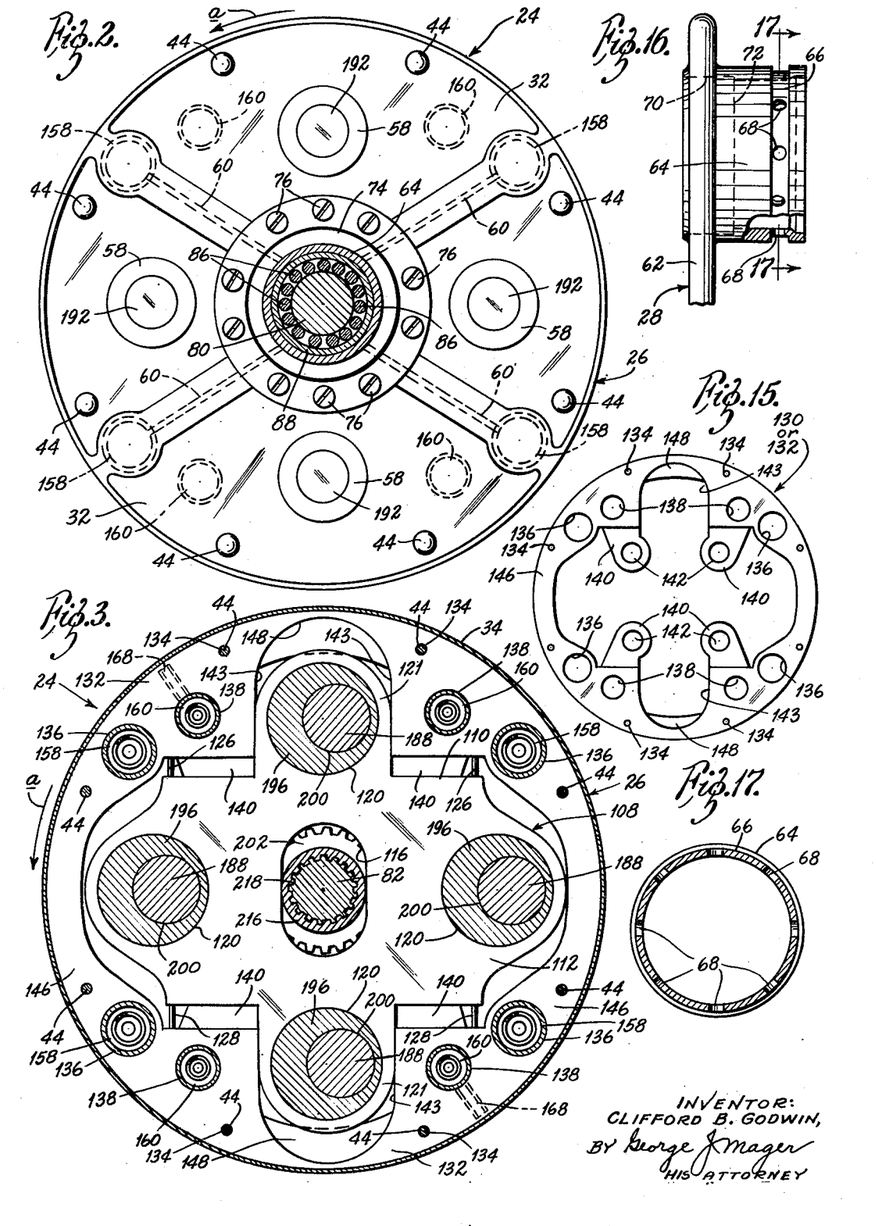
Figure 2 is a rear elevational view thereof, partly in vertical section, and taken substantially on the line 2—2 of Figure 1.
Figure 3 is a vertical sectional view taken on the line 3—3 of Figure 1.
Figure 15 is an elevational view of a monocoque rib.
Figure 16 is a fragmentary side elevational view, partly in vertical section, of the upper end portion of the supporting standard for the mechanism.
Figure 17 is a vertical sectional view taken on the line 17—17 of Figure 16.
Figures 4, 5, 8:
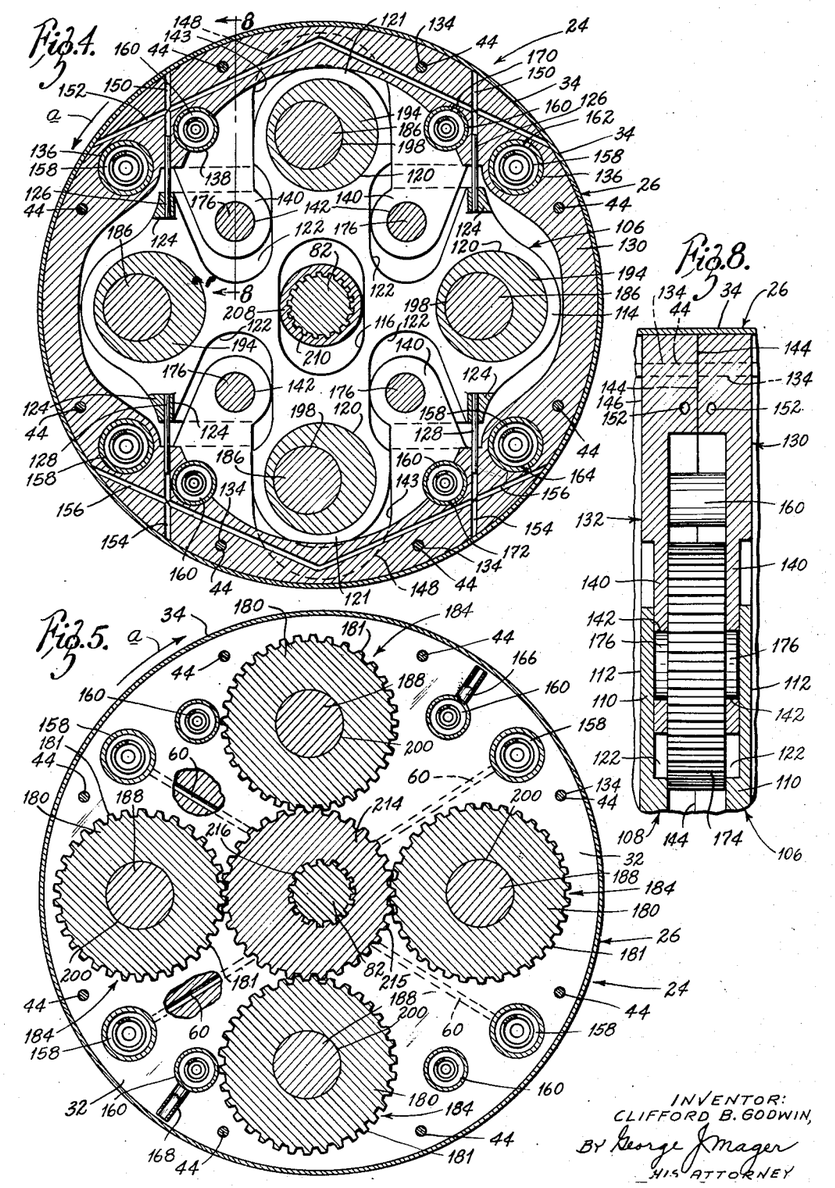
Figure 4 is a vertical sectional view taken generally along the line 4—4 of Figure 1, all portions of the front shuttle monitor except the piston pin supporting bosses thereof being shown in elevation, for clarity of illustration.
Figure 5 is a vertical sectional view taken on the line 5—5 of Figure 1.
Figure 8 is an enlarged fragmentary vertical sectional view taken on the line 8—8 of Figure 4.
Figure 18:
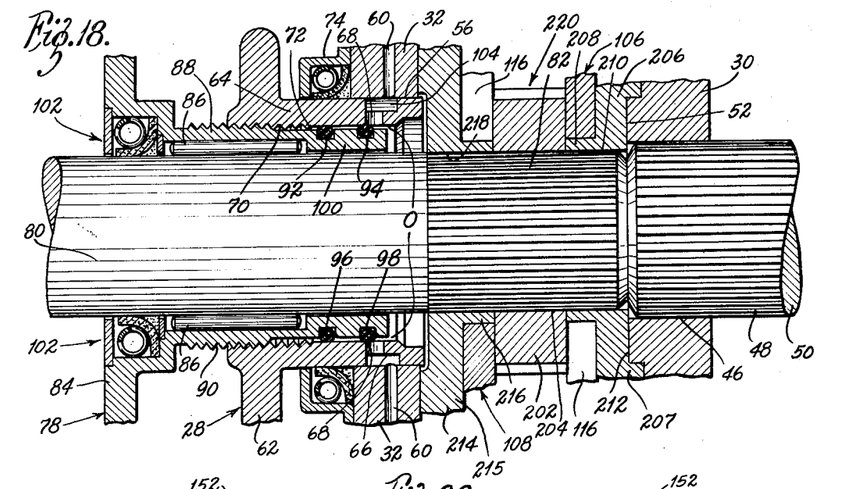
Figure 18 is an enlarged sectional reproduction of a portion of Figure 7, certain elements being illustrated in a moved position relative to the disposition of them exhibited in Figure 7.

As best seen in Figures 2, 5, and 18, the rear wall 32 has also formed therein a series of four approximately radially disposed passageways 60, the purpose of which will appear.

The steady-rest 28 includes a standard portion 62, which may terminate at one end in any desired configuration for mounting same rigidly to a base. At the free end of the standard 62, an integral forwardly projecting hollow hub 64 extends into the opening 56 of the rear wall 32, whereby to rotatably support the casing 26 and the mechanism therein. As seen to best advantage in Figures 16 through 18, the hub segment 64 has formed therein adjacent the forward end thereof, an annular recess or groove 66. A plurality of spaced radial openings 68 is provided in said groove, and the internal periphery of the rearward section of said hub is threaded as indicated at 70, the threads terminating so as to provide a circular shoulder 72, for reasons to appear.

Suitable means are provided for sealing the opening 56 about the hub segment 64. Preferably, as portrayed particularly in Figure 7, a cup element 74 secured to the rear wall 32 by screws 76, which cup encloses a commercial type of seal assembly, is employed to this end. It is also here noted, that the connection between splined end 48 of the shaft 50 and the opening 46 is of a tight fitting nature so as to form an effective seal at that point also.

Numeral 78 indicates generally, the manually operable means for controlling the hydraulic system in a manner to appear. Numeral 80 designates the driven or output shaft which terminates at its forward end in a splined section 82, the end face of the latter being disposed contiguous to the similar face of the splined section 48 of the drive or input shaft 50, as clearly shown in the drawings.

The manual control means assembly 78 includes a handwheel 84 mounted on a circular series of suitable needle bearings 86 for rotation about the output shaft; a forwardly projecting sleeve segment 88 integral with said handwheel; an externally threaded portion 90 on the sleeve segment in engagement with the threaded section 70 of the hub segment 64; and a pair of spaced O-rings 92 and 94, seated respectively in a rearward annular groove 96, and in a forward annular groove 98 provided therefor in the forward unthreaded portion 100 of the sleeve segment. With reference to Figure 18, it is seen that a suitable sealing arrangement generally indicated 102, is provided about the output shaft 80 to obviate leakage at that point.

From the foregoing, it should be evident that the peripheral groove 66 combines with the annular series of radial ports 68 to form a toroidal chamber 104 which will hereinafter be termed the confluence chamber. Chamber 104 is at all times in fluid communication with the inner or discharge ends of the passageways 60, as best demonstrated in Figure 18.

Included in the mechanism 24 as hereinbefore indicated, are two shuttle monitors of identical configuration. In the interest of clarity in the description to follow hereinafter, the forwardly disposed monitor is designated as a whole by the numeral 106, the rearwardly disposed monitor by the numeral 108.

The structural details of each of said monitors is exhibited most clearly in Figures 9 through 14, where it is seen that they constitute plate elements. Each monitor or plate element includes a main body portion 110 having a planar face 112, and a recessed face 114. Centrally thereof, the body portion 110 has formed therein an elongated opening 116; and spaced ninety degrees apart along an imaginary circle drawn about the center 118 of each monitor, the body portion 110 has provided therein circular openings 120, as shown. As viewed in Figures 9 and 11, the upper and lower diametrically opposite openings 120 are formed in extensions 121 which are integral with the body portion 110.

Figures 6, 11, 12, 13, 14, 19, 20, 21:
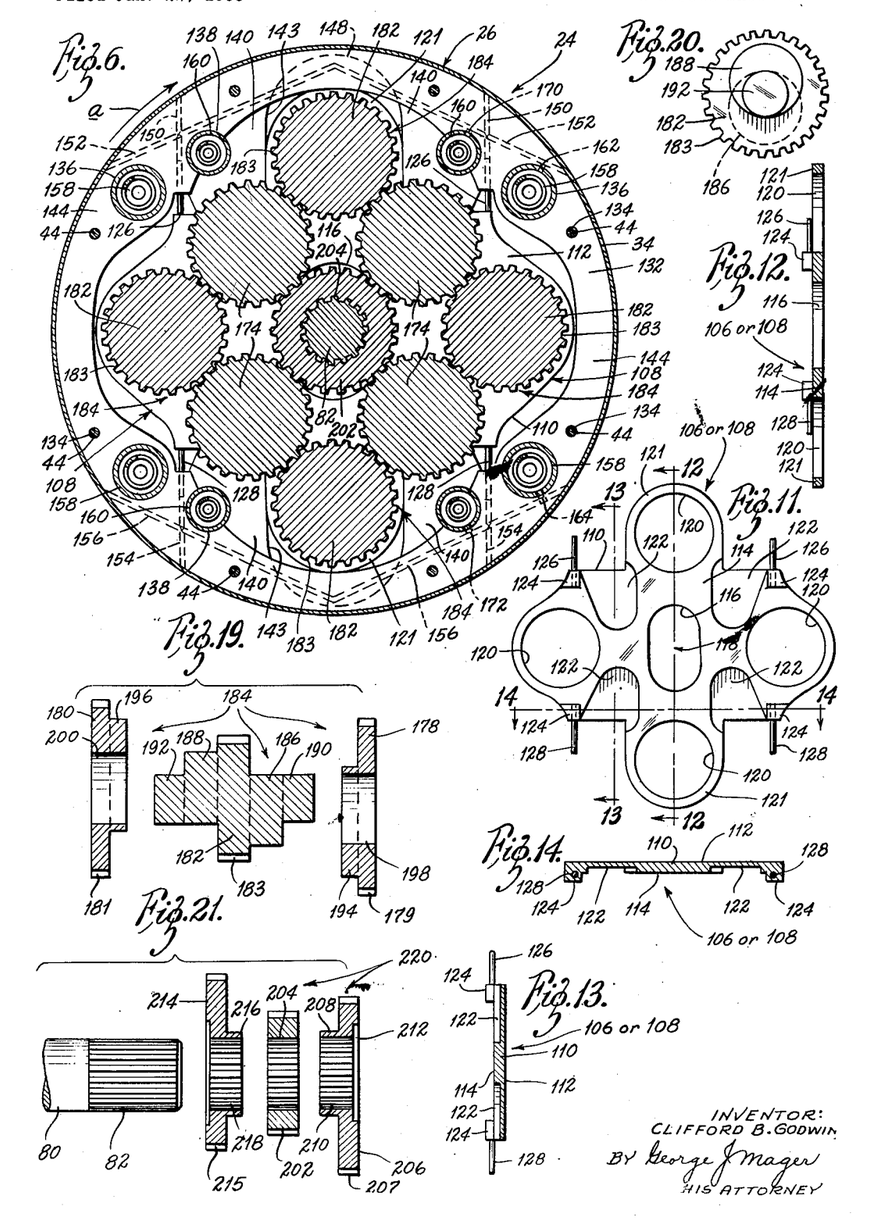
Figure 6 is a similar view taken on the line 6—6 of Figure 1.
Figure 11 is an elevational view of the shuttle monitor shown in Figure 9, the opposite or recessed face thereof being presented.
Figures 12 and 13 are vertical sectional views taken respectively on the lines 12—12 and 13—13 of Figure 11.
Figure 14 is a horizontal sectional view taken on the line 14—14 of Figure 11.
Figure 19 is a somewhat schematic sectional view demonstrating the axial disposition of a balanced pair of reverse gear members relative to a facsimile gear member, these gear members being shown separated, although in actual assembly they are telescoped for independent rotative action whereby they constitute a double cross unit.
Figure 20 is a left end elevation of the facsimile gear member included in Figure 19.
Figure 21 is a somewhat schematic sectional view demonstrating the axial disposition of a balanced pair of eccentric cluster gears, a sun gear associated therewith, and the splined end of the driven shaft, these members being shown separated, but forming, when assembled within the casing, a cluster unit.
Figure 10:
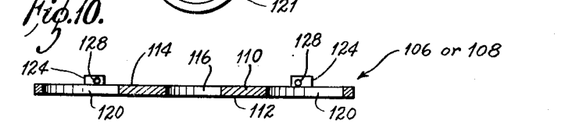
Figure 10 is a horizontal sectional view taken on the line 10—10 of Figure 9.

For a reason to appear, the face 114 of each monitor has formed therein four recesses 122 the contour of which is portrayed particularly in Figures 4 and 11. Projecting from the recessed face 114 of each monitor, are four integral bosses 124, each of which rigidly supports a projecting piston in the form of a pin. Thus as viewed in the drawings, each of the shuttle monitors 106 and 108 incorporates a set of two upwardly extending pistons 126, and a set of two downwardly extending pistons 128.

Also included in the mechanism 24 as hereinbefore indicated, is a pair of mating monocoque rib members of identical configuration. In the interest of clarity in the description to follow hereinafter, the forwardly positioned monocoque rib is designated in its entirety by the numeral 130, the rearwardly positioned counterpart by the numeral 132. The structural details of each of said rib members is exhibited most clearly in Figure 15 augmented by Figures 3, 4, 6, 7, and 8.

Each monocoque rib 130 or 132 is of circular configuration so as to fit tightly against the internal periphery of the cylindrical shell 34, and has formed therein a circular series of holes 134, through which the fastening elements 44 extend.

Each monocoque rib is also provided with a first series of four circular openings 136, and a second series of four circular openings 138. Each rib is further provided with four inwardly extending arms 140 each of which has a bearing opening 142 formed therein as shown. Numerals 143 designate diametrically opposite access openings of the configuration shown, which openings as will appear, slidably accommodate the extensions 121 of the shuttle monitors.

In the assembled relation of the mechanism the monocoque ribs 130 and 132 have their inner faces 144 contiguously disposed, as clearly shown in Figures 7 and 8, with the openings 136 and 138 in alignment. Numerals 146 designate the opposite or outer faces of said ribs, each of which as best seen in Figures 3, 8, and 15 has a pair of diametrically opposite arcuate indentations or recesses 148 formed therein, for reasons to appear.

As hereinbefore stated, each shuttle monitor includes a set of piston elements 126, and a set of similar elements 128. As seen in Figure 4, the upwardly extending pistons 126 are reciprocably disposed in cylinder portions 150 provided therefor in the monocoque ribs 130 and 132. The cylinder portions 150 of each rib are in communication with a transversely formed fluid passageway 152, the ends of which are, so to speak, plugged by the shell 34. The downwardly extending pistons 128 are recirprocably disposed in cylinder portions 154 provided therefor in the monocoque ribs. The cylinder portions 154 of each rib are in communication with a transversely formed fluid passageway 156, the ends of which are, so to speak, likewise plugged by the shell 34. It is noted at this time, that the shell 34 also serves to plug the outer ends of the cylinder portions 150 and 154.

Incorporated in the mechanism 24, are eight commercial type poppet check valves designed for use in hydraulic systems which require positive check performance. The type of valve under consideration is leakproof. The operative mechanism thereof is enclosed in a cylindrical casing, and includes a circular seal element adapted to float between opposed conical seats against one of which it is normally maintained by means of a coil spring.

The present invention makes no claim whatever to the structural composition of these check valves, and therefore they are not illustrated in detail, but are more or less schematically shown. Four of the eight check valves function in a discharge capacity, the other four function in a suction capacity, as will appear.

Thus, mounted in each pair of aligned openings 136 of the contiguously disposed monocoque ribs is a discharge check valve assembly designated in its entirety by the numeral 158. Similarly, mounted in each pair of aligned openings 138 of the contiguously disposed monocoque ribs 130 and 132, is a suction check valve assembly designated in its entirety by the numeral 160.

Figure 22:
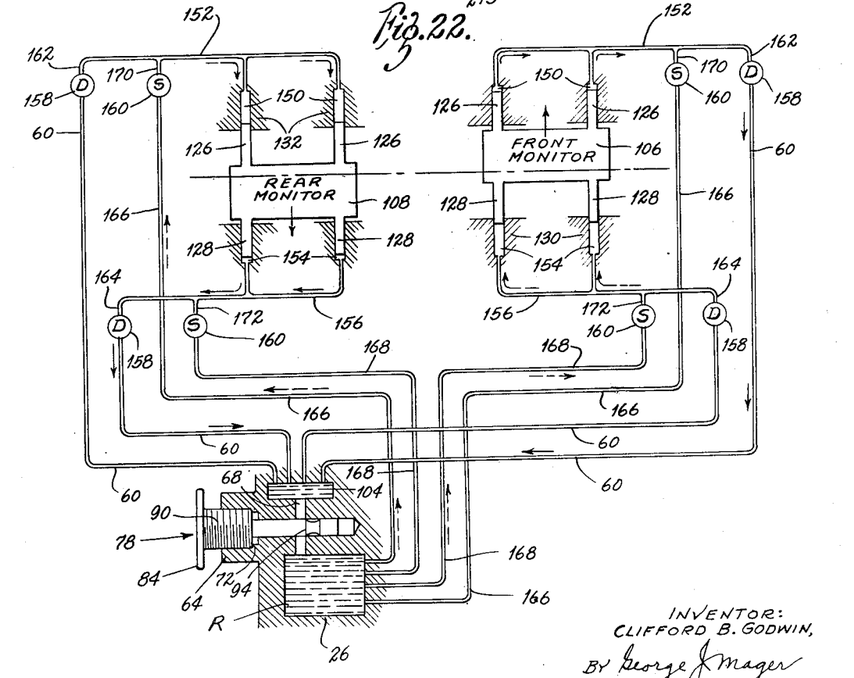
Figures 22, 23, and 24 are schematic layouts demonstrating the pumping action of the hydraulic system included in the invention, responsive to the sinusoidal movements of the shuttle monitors.
Figure 23:
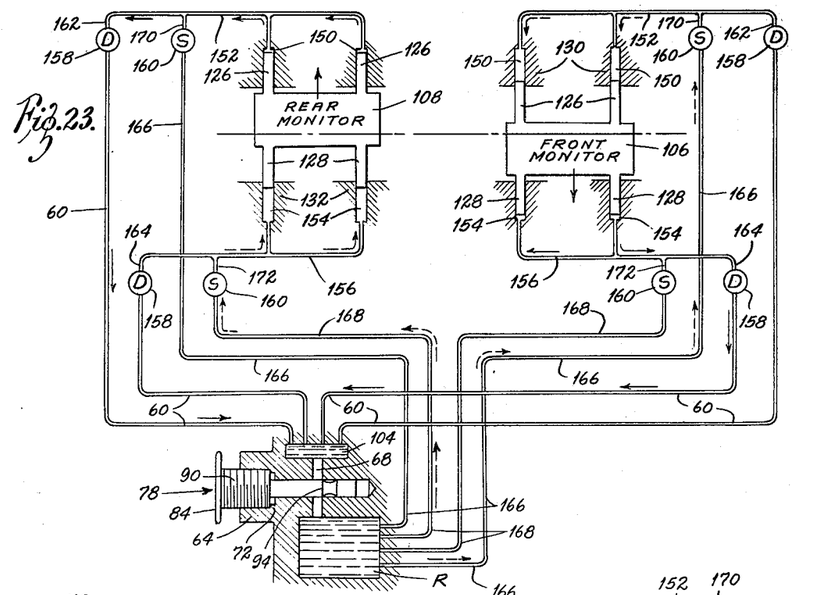
Figure 24:
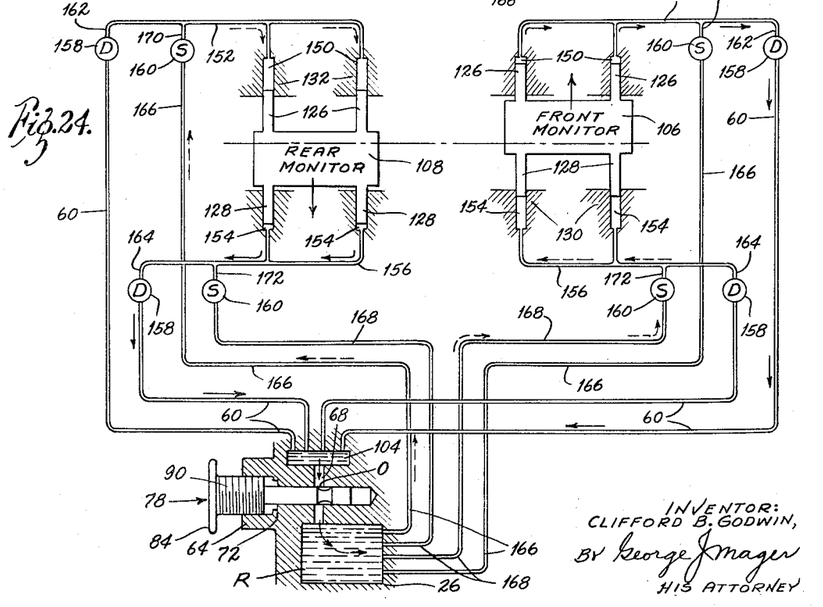

With particular reference to Figures 4 and 6, and also to the schematic diagrams presented in Figures 22 through 24, the inlet ports 162 for accommodating incoming fluid to the upper pair of discharge valve assemblies 158 are in fluid communication with the passageways 152, and the inlet ports 164 of the lower pair of discharge valve assemblies 158 are in fluid communication with the passageways 156. Each of the four discharge valve assemblies 158 has an outlet, being one of the four passageways 60, each in fluid communication with the confluence chamber 104.

The inlet or suction sides of the upper pair of suction valve assemblies 160 are in fluid communication with the interior of the casing 26 via tubular extensions 166, and the inlet sides of the lower pair of suction valve assemblies 160 are in fluid communication with the interior of said casing via tubular extensions 168. The outlet or discharge sides of the upper suction valve assemblies 160 are in fluid communication with the transverse passageways 152 via ports 170, and the outlet or discharge sides of the lower suction valve assemblies 160 are in fluid communication with the transverse passageways 156 via ports 172.

With particular reference now to Figures 4 and 8, it is noted that the bearing arms 140 of the nonocoque ribs are accommodated by the recesses 122 of the shuttle monitors. An idler gear 174 is rotatably supported between each pair of arms, each of said gears being provided with laterally projecting journals 176 which extend into the bearing openings 142.

With reference now particularly to Figure 19, numeral 178 designates a front reverse gear member, numeral 180 a rear reverse gear member, and numeral 182 designates a facsimile gear member. These three gear members, wrhen in assembled disposition in the casing constitute a double cross unit of gearing which is generally designated 184. There are four double cross units 184, each unit being rotatably mounted as will appear.

With reference also to Figure 20, each of the four facsimile gear members 182 includes a facsimile gear 183 as the middle component, and oppositely disposed eccentric front and rear journal or cam portions designated 186 and 188, which terminate in front and rear trunnions 190 and 192 respectively, said trunnions and said gear 183 being concentric. Each facsimile gear member 182 is rotatably supported in one of the four pairs of aligned bearings 54 and 58, the trunnion 190 extending into one of the bearings 54 of the front wall 30, the trunnion 192 extending into an aligned bearing 58 of the rear wall 32, as clearly illustrated in Figures 2 and 7. It is to be understood that the relative disposition of said trunnions and bearings is also of a tight-fitting nature so as to form an effective seal against leakage of fluid at these points.

The front reverse gear members 178 are each rotatably mounted on the eccentric cam journal 186 of a facsimile gear member 182. The rear reverse gear members 180 are each similarly mounted on the eccentric cam journal 188 of a facsimile gear member.

Each front reverse gear member 178 includes a reverse gear 179 integral with a rearwardly projecting eccentric hub 194. Each rear reverse gear member 180 includes a reverse gear 181 integral with a forwardly projecting eccentric hub 196. In the assembled unit 184, the projecting hubs 194 and 196 are diametrically oppositely disposed. A circular opening 198 extends through the front reverse gear member 178, which opening is concentric with the gear 179, and receives the front cam 186 of the facsimile gear member 182. Similarly, a circular opening 200 extends through the reverse gear member 180, which opening is concentric with the gear 181, and receives the rear cam 188 of facsimile gear member 182.

With particular reference now to Figure 21, wherein the splined end portion 82 of the driven or output shaft 80 also appears, numeral 202 designates a sun cluster gear which is internally and co-axially splined as at 204 for engaging the splined end portion 82 of the shaft 80. Numeral 206 indicates a front eccentric cluster gear member including an eccentric gear 207 and a rearwardly projecting hub 208. The member 206 is internally splined co-axially with the hub 208 as indicated at 210, for engaging the splined end 82 of the shaft 80. The front face of the gear member 206 has an annular depression or recess 212 formed therein, said recess being concentric with the hub 208, said hub however being eccentric to the gear 207, as illustrated.

Numeral 214 designates a rear eccentric cluster gear member including an eccentric gear 215 and a forwardly projecting hub 216. The member 214 is internally splined co-axially with the hub 216 as indicated at 218, for engaging the splined end 82 of the shaft 80. The hub 216 is eccentrically formed on the gear 215, so that when the three gear members 214, 202, and 206 are in assembled disposition on the splined end portion 82 of said shaft, the eccentricity of the gears 207 and 215 is diametrically opposite. In such assembled status, the gears 202, 207, and 215 together with the hubs 208 and 216, form what will hereinafter sometimes be termed the cluster unit of the mechanism 24. This unit is designated generally by the numeral 220, and its disposition on the central axis, and relatively to the other described elements of the mechanism is clearly portrayed especially in Figures 6, 7, and 18.

Reverting at this point to the four double cross units 184, and with particular reference to Figure 6, it is noted that each facsimile gear 183 included as part of the facsimile gear member 182 is in meshing engagement with two of the four idler gears 174. Further, and with particular reference to Figure 7, it is noted that each of the four front reverse gears 179 is in meshing engagement with the front eccentric cluster gear 207 of the cluster unit 220, and that each of the four rear reverse gears 181 is in meshing engagement with the rear eccentric cluster gear 215 as best seen in Figure 5. As best seen in Figure 4, the eccentric hubs 194 of the front reverse gear members 178 extend through the openings 120 of the front shuttle monitor 106, and as seen in Figure 3, the eccentric hubs 196 of the rear reverse gear members 180 extend through the openings 120 of the rear shuttle monitor 108.

With further reference to the cluster unit 220, it is noted that the bearing boss 52 of the front wall 30 extends into the annular recess 212 of the front eccentric cluster gear member 206 as portrayed in Figure 7. The projecting hub 208 of the front eccentric cluster gear member 206 extends into the elongated opening 116 of the front shuttle monitor 106. The sun gear 202 is in meshed engagement with each of the four idler gears 174. The rear eccentric cluster gear 215 as previously noted, is in meshed engagement with each of the rear reverse gears 181 of the four double cross units 184. The projecting hub 216 of the rear eccentric cluster gear member 214 extends into the elongated opening 116 of the rear shuttle monitor 108.

Prior to entering into a detailed description of the manner in which the invention operates, a few general observations will be given. Thus with reference to the drawings, it should be remembered that the casing 26 is rotatable. Therefore the disposition of various included elements relatively to, for example, an imaginary perpendicular line drawn through the central axis of the mechanism as viewed in Figures 2 through 6, may vary from that selected for illustrative purposes. In other words, with reference for example to Figure 9 which portrays the shuttle monitors, the pistons 126 have been described as "extending upwardly," and the pistons 128 as "extending downwardly." Obviously, when the monitors rotate to a position ninety degrees from the position shown, said pistons would extend laterally, and so on, as is understood.

The casing 26 is sealed against leakage of the fluid in the hydraulic system as hereinbefore described. Preferably, this fluid is an oil, a predetermined quantity of which may be introduced into the casing through a suitable opening, which is not shown. The opening referred to is appropriately sealed following the introduction of the fluid medium.

With respect to some of the principal elements included in the invention, it is to be remembered that the hub segment 64 of the standard 28 is stationary. The casing 26 is rotatable as a unit which includes in assembly: the front wall 30; the rear wall 32; the shell 34; the mated monocoque ribs 130 and 132; the four discharge check valve assemblies 158; the four intake check valve assemblies 160; the series of fastening elements 44; the bearings 54 and 58; and the sealing means 74. That is to say, the relative disposition of the parts enumerated is constant, irrespective of whether the mechanism is functioning in a clutch, coupling, or speed reducer capacity.

The hydraulic system control assembly 78 is normally stationary. However, the disposition thereof relatively to the hub segment 64 of the standard 28 is variable, a selected disposition being obtainable by the manipulation of the handwheel 84 included in said assembly.

Except when the invention functions in a coupling capacity, as will be explained further on, the shuttle monitors 106 and 108 including their pistons 126 and 128 are reciprocating elements, the reciprocations of them being one hundred and eighty degrees out of phase. The four facsimile gear members 182 which rotate bodily with the casing 26 along an orbital path concentric with the central axis of the mechanism, may each simultaneously and mutually also rotate about its own axis, while at the same time, the front and rear reverse gears of each unit 184 will have a mandatory rotation as a unique dependency respectively about the eccentric cams 186 and 188.

The cluster unit 220, rigidly mounted on the splined end portion 82 of the output shaft 80, manifestly rotates about the central axis of the mechanism with said shaft whenever the latter is driven. Also, since the front wall 30 of the casing 26 has a rigid connection with the splined end 48 of the drive shaft, said casing rotates whenever the drive shaft 50 is energized.

*Operation*

The transfer of power from the input to the output shaft, either at the same or at any selected reduced speed, is attainable by the manipulation of the handwheel 84 of the control assembly 78. An almost infinite range of output speed variations may be obtained because of the finely threaded portion 90 of the sleeve segment 88, which travels axially almost inperceptibly when said handwheel is rotated.

With reference particularly to Figures 7, 18, and 22 through 24, some of the oil in the hydraulic system is discharged into the annular chamber 104 in a manner to be explained. For the present, it is to be understood that chamber 104 is at all times filled with oil, irrespective of the capacity in which the mechanism is functioning. Whenever the handwheel 84 has been manipulated to bring the sleeve segment 88 to the right against its limiting stop 72 as portrayed in Figures 7, 22, and 23, the O-rings 92 and 94 cooperate, because of their resultant disposition, to seal the confluence chamber 104 whereby to trap and confine the fluid within said chamber, and thereby to stop the circulation thereof completely and entirely.

If the handwheel 84 is now manipulated to cause the sleeve segment 88 to move leftwardly for example to the position thereof shown in Figures 18 and 24, the resultant disposition of the rings 92 and 94 will be such that an orifice designated O is produced, whereby the oil may drain into the casing via the ports 68 as should be clear.

It is noted that in the interest of clarity, the body of oil in the casing is portrayed in the schematic Figures 22 through 24 layouts as being in a reservoir designated R, so that whenever mention is made hereinafter of the reservoir, it will be understood that the interior of the casing 26 is meant.

It will be seen that when the orifice O is non-existent, that is when the Figures 7, 22, and 23 condition obtains, the mechanism functions as a coupling in a direct drive transmittal capacity; that when the orifice is existent, that is when the Figures 18 and 24 condition obtains, the mechanism functions both as a clutch and as a speed reducer.

It will further be seen that the speed reduction is variable, as previously indicated. In other words, when the orifice area is small, the coupling functioning is not eliminated and correspondingly it remains a coupling of limited degree. When the orifice area is increased by causing the sleeve 88 to move to the left, speed reduction is correspondingly increased, and vice versa, as should be understood. When the handwheel has been manipulated to cause the orifice to reach what will be termed its "fully open" position, it will be seen that a clutch disengagement status has been effected.

Consequently, between the "fully open" and what will be termed the "fully closed" status of the orifice, any desired speed reduction between direct drive and no drive may be obtained by the control assembly 78 in cooperation with the ports 68 leading from confluence chamber 104.

In other words, assuming that the sleeve 88 were moved leftwardly from its Figures 22–23 position ever so slightly, whereby to permit only a negligible quantity of fluid to trickle through the orifice O, the mechanism would nevertheless function in a coupling capacity, although less positively than when the orifice is in "fully closed" disposition. In this unillustrated status of the orifice, the trickle of fluid therethrough would be sufficient to substantiate the fluid flow demonstrated by arrows in Figures 22 and 23, as will be explained.

With specific reference now to Figures 22 through 24, it is seen that the shuttle monitors or plate elements 106 and 108 are reciprocated in a manner to be explained, in response to eccentric hubs which are one hundred and eighty degrees out of phase. The upper half of each monitor including the pistons 126, in association with the cylinders 154, may also be considered a pump, the two pumps, inherently part of each of the monitors, operating out of pumping synchronism.

Thus for example in Figure 24, the rear shuttle monitor 108 is shown approaching the end of its downward movement, thereby exhibiting the discharge stroke of its lower pump, and the suction stroke of its upper pump. Simultaneuosly, the front shuttle monitor 106 is shown approaching the end of its upward movement, thereby exhibiting the discharge stroke of its upper pump, and the suction stroke of its lower pump.

Consequently, during each downward movement of the rear monitor 108, oil in the cylinders 154 is forced therefrom by the pistons 128 to discharge via passageway 156 and inlet 164 of the rear monocoque rib 132 into one of the lower pair of discharge valve assemblies 158, thence via one of the passageways 60 into confluence chamber 104. Simultaneously, oil is withdrawn from the reservoir and into the cylinders 150 by the pistons 126 via an inlet 166 of one of the upper suction valve assemblies 160, thence via outlet 170 and passageway 152 of the rear monocoque rib 132.

During each upward movement of the rear monitor 108, as demonstrated in Figure 23, assuming for the purpose at hand that the orifice permits slight fluid passage, the oil taken into the cylinders 150 during the immediately preceding downward stroke of said monitor, is forced from said cylinders by the pistons 126 to discharge via passageway 152 and inlet 162 of the rear monocoque rib 132 into one of the upper pair of discharge valve assemblies, thence via one of the passageways 60 into confluence chamber 104. Simultaneously, oil is withdrawn from the reservoir and into the cylinders 154 by the pistons 128 via an inlet 168 of one of the lower suction valve assemblies 160, thence via outlet 172 and passageway 156 of the rear monocoque rib.

The front monitor 106 operates in identical fashion, and it is deemed prolix to repeat the immediately foregoing description. The fluid flow is adequately demonstrated in the three schematic views, wherein full line arrows indicate the discharge flow, and broken line arrows indicate the suction flow. Directional arrows are also applied to the monitors. In addition to the reference numerals, the letter D has been applied to the discharge valve assemblies 158, and the letter S has been applied to the suction valve assemblies 160. The centerline which appears in these views is representative of the central axis of the mechanism 24, and when the shuttle monitors during their out of phase reciprocations are so to speak in momentary registry, the centers of the monitors, designated at 118 in Figure 9, register on said central axis.

From the foregoing, it should be manifest that with the orifice O in "fully open" disposition, the fluid medium circulates freely from the reservoir R to the confluence chamber 104, and back to the reservoir in response to the pumping action of the monitors. It should also be manifest that since none of the oil is impounded in the confluence chamber, or in any of the passageways or cylinders in communication therewith, the monitors 106 and 108 may reciprocate freely. At such times, as has been stated and as will be more fully explained, the mechanism 24 transmits no motion whatever from the input to the output shaft, said mechanism being in what may be termed a non-clutching or neutral status.

Assuming now that the handwheel 84 were rotated to partially close the orifice, the fluid flow from confluence chamber 104 to reservoir R would be restricted somewhat, so that monitor reciprocations would be retarded slightly. At such time, as has been stated and as will be more fully explained, the mechanism 24 does transmit motion from the input to the output shaft, said mechanism being in what may be termed a clutching and speed reducing status of variable speed transmission capability. In this connection, attention is directed to the lower portion of Figure 24, where the status referred to is visibly, albeit diagrammatically presented.

Assuming that the handwheel 84 were rotated to entirely close the orifice O, the flow of fluid from confluence chamber 104 to reservoir R would be completely shut off. As a result, the pressure of impounded oil in the confluence chamber 104 and the cylinders 150 and 154 in fluid communication therewith, would quickly forestall further reciprocations of the monitors. At such time, no flow of fluid would occur but as has been stated and will be more fully explained, the mechanism 24 would transmit motion from the input to the output shaft in equivalent ratio, said mechanism thus being in what may be termed a coupling status. In this connection, attention is directed to the lower portions of Figures 22 and 23, where the status referred to is visibly, albeit diagrammatically presented.

It is deemed apropos to note at this time, that none of the oil in the system is under any circumstance subject to volumetric change even though impounded, and that the oil circulation provides adequate lubrication for the moving elements of the mechanism at all times.

It will now be assumed that the orifice O of the hydraulic system is in "fully open" disposition, so that the mechanism is in a neutral status, as hereinbefore explained. It will further be assumed that the drive or input shaft 50 is turning clockwise as observed by an individual standing beside the power source. Viewed from this standpoint, the casing 26 always rotates clockwise with the input shaft, as indicated by the arrows *a* in Figures 2 through 6.

With the mechanism 24 in such exemplary neutral status, it is believed that a more comprehensive understanding of the operational action may be had in contemplation of a single complete revolution of the input shaft 50, and the resultant behaviour of the elements affected thereby.

Thus, during a single revolution of the shaft 50 and casing 26, the monocoque ribs 130 and 132 also complete one clockwise revolution, since they are rigid with said casing. The four double cross units 184, which are rotatably mounted in the bearings 54 and 58 of the casing end walls, each also complete one clockwise revolution along an orbital path concentric with the axially aligned input and output shafts 50 and 80 respectively.

It is noted that each reverse gear 179 of the double cross unit front reverse gear members 178 is of a like diameter, and is provided with the same number of teeth as the eccentric cluster gear 207 with which it is in mesh.

It is to be noted furthermore, that each of the said gears 179 and the said gear 207 has a rotary movement respectively, with reference to the casing 26, and that at each meshing engagement occurring at the cooperating pitch circles of mating gears there is turning with reference to the casing 26 in one direction for one of the mating gears, with reverse turning for the other.

Consequently, during the single complete clockwise revolution of casing 26, each front reverse gear 179 rolls around the eccentric gear 207 once, thus completing with reference to the casing 26, one independent clockwise revolution about the eccentric cam 186 whereon said reverse gear 179 is rotatably mounted.

Attention is again directed to the exemplary neutral status of the mechanism, and to the fact that the output shaft 80 has not moved at all up to this point.

In consequence of the aforesaid independent clockwise revolution of the gears 179, their eccentric hubs 194, disposed in the openings 120 of the front shuttle monitor 106, reciprocate the latter in sinusoidal fashion twice, that is to say, once in each of two opposite directions.

Each reverse gear 181 of the double cross unit rear reverse gear member 180 is of a like diameter, and is provided with the same number of teeth as the eccentric cluster gear 215 with which it is in mesh. Consequently, during the contemplated single complete clockwise revolution of casing 26, each reverse gear 181 rolls around the cluster gear 215 once, thus completing with reference to the casing 26, one independent clockwise revolution about the eccentric cam 188 whereon said reverse gear 181 is rotatably mounted.

In consequence of the aforesaid independent clockwise revolution of the gears 181, their eccentric hubs 196, disposed in the openings 120 of the rear shuttle monitor 108, reciprocate the latter in sinusoidal fashion twice, that is to say, once in each of two opposite directions.

Since it has been noted that the eccentric hubs 194 and 196 are one hundred and eighty degrees out of phase, it should be manifest that when activated, the monitor 106 moves in a direction opposite to that of the monitor 108. It will be remembered that this action has been clarified in the description hereinbefore given relatively to Figures 22 through 24.

And with particular reference to Figure 6, it should likewise be manifest that during the single clockwise revolution of the casing 26, the facsimile gear 183 of each double cross unit 184 neither revolves nor rolls, but remains stationary, wherewithal the rotary movement of the casing 26 is a significant contrast, and manifestly the facsimile gear 183 of each double cross unit 184 completes (from the standpoint as hereinbefore adopted, that is with reference to the casing 26), its own independent revolution as is evidenced by the equivalent turning of the trunnions 190 and 192 in bearings 54 and 58 of the casing end walls, while the casing 26 completes one orbit of bodily travel.

Further, it should likewise be manifest that the behavior of the eccentric cams 186 and 188 as well as the trunnions 190 and 192 of each double cross unit is identical with the gear 183 thereof.

From the foregoing, it should be clear that the four front reverse gears 179, and the four rear reverse gears 181 all complete one clockwise revolution, each about its own individual axis, during a single complete clockwise revolution of the input shaft 50 and of the casing 26 rigid therewith. At the same time, each of said eight gears also completes one clockwise revolution of orbital bodily travel about the non-rotating cluster unit 220.

Simultaneously also, each of the four facsimile gears 183 completes one clockwise revolution of orbital bodily travel about the sun cluster gear 202 of the cluster unit 220, and in doing so neither revolves nor rolls (being a facsimile of the non-moving sun gear 202), yet each has its own particular relative motion in reference to casing 26, and thus each completes its own independent revolution with respect to said casing in like fashion, whereby the trunnions 190 and 192 turn in the bearings 54 and 58 of the casing end walls.

As previously noted, and as best seen in Figure 6, each of the facsimile gears 183 is in meshed engagement with two of the idler gears 174, and each of the idler gears 174 is in meshed engagement with the sun cluster gear 202. All nine of these gears, that is the four gears 183, the four idler gears 174, and the gear 202, are of the same diameter and are each provided with an identical number of peripheral teeth.

It will be remembered that the idler gears 174 are each supported in the bearings 142 of an aligned pair of arms 140, one arm being formed on the front monocoque rib 106, the other on the rear monocoque rib 108.

Consequently, during the presently contemplated single clockwise revolution of the casing 26 and the rigidly attached monocoque ribs, the idler gears 174 each complete one clockwise revolution of bodily orbital travel. Simultaneously however, although the four facsimile gears neither revolve nor roll in theiir orbital bodily travel, each of the four idler gears 174 does complete with respect to the casing 26, one clockwise revolution about its own axis in rolling around the non-moving sun cluster gear 202.

It is thus seen that irrespective of the rotary speed of the input shaft 50, no motion is transmitted to the output shaft 80, since all components of the cluster unit 220 are unaffected, and remain in stationary status so long as the orifice O of the hydraulic system remains in "fully open" disposition. The flow of fluid from reservoir R into and out of confluence chamber 104 being unrestricted, the shuttle monitors may reciprocate freely. As a result, the other described elements also behave in the manner explained, so that a "neutral" condition obtains.

Assuming now that it is desired for example to transmit to the output shaft 80 a rotational speel tantamount to approximately one-half that of the input shaft 50, handwheel 84 will be manipulated to advance the rings 92 and 94 to the right as viewed in Figure 18, until a status intermediate the "fully open" and "fully closed" status of the orifice O is attained. Such an approximate status is exhibited in Figure 24, and it will be remembered that the resultant behavoir of the shuttle monitors at such time has been set forth in detail hereinbefore.

However, it is believed worth repeating that as the fluid flow from confluence chamber 104 into reservoir R is increasingly restricted, the reciprocatory sinusoidal movements of the shuttle monitors are correspondingly decelerated.

Therefore, the previously described single clockwise revolution that each front and each rear reverse gear completed about its own axis during the contemplated single clockwise revolution of the casing, is now reduced to one half of a clockwise revolution with respect to said casing. That is to say, the reciprocatory strokes of the shuttle monitors are slowed down, by the fluid impounded in the cylinders 150 and 154, to approximately fifty percent of the maximum velocity they may attain in the previously explained "neutral" status of the mechanism.

As a result of this restraint (bearing in mind that these gears 179 and 181 nevertheless simultaneously do complete a clockwise orbital revolution as heretofore), motivating forces from said gears are transmitted to the eccentric cluster gears 207 and 215 via tooth engagement sufficient to rotate the output shaft 80, approximately one half of one revolution.

Manifestly therefore, the mechanism is now functioning in a coupling capacity of speed reducing characteristics, in that for every two complete revolutions of the input shaft 50, the output shaft 80 would complete one revolution. It should also be manifest that this exemplary approximate speed ratio may be varied by manipulation of the handwheel 84. If the latter be turned to further constrict the orifice, a further slowing down of shuttle monitor velocity will result, and the output shaft speed will correspondingly be increased. Conversely, if the handwheel 84 be turned oppositely to further expand the orifice, a further acceleration of shuttle monitor velocity will result, and the output shaft speed will correspondingly be decreased.

Assuming that the handwheel 84 be turned so as to propel the rings 92 and 94 forwardly to the position they occupy in Figure 7, the orifice O may be said to vanish, resulting in the radial immobility of the shuttle monitors, as should now be obvious. Under the circumstances thus prevailing, the reverse gears 179 and 181 cannot revolve about their individual axes. However, they do complete one clockwise orbital revolution bodily in unison with the casing 26, so that the four point tooth interlock of the gears 179 with the cluster gear 207, and the four point tooth interlock of the gears 181 (see Figure 6), cause the output shaft 80 to revolve at the same speed as that of the casing 26 and the input shaft 50 rigid therewith. Thus a condition of direct drive wherein input and output shaft speed coincide will be had.

Irrespective of whether the mechanism 24 is in neutral status or in power transmission status, the facsimile gears 183 play an important role in that they insure smooth operation of the gearing and the shuttle monitors at all times. It is noted that the term "facsimile" has been applied to these gears because their behavior with respect to their own individual axes is identical with that of the cluster gear unit 220 at all times.

In other words, whenever the output shaft 80 is immobile, each of the gears 183 is likewise immobile as observed by an individual standing beside the power source as was originally set forth hereinbefore. In other words, one is the facsimile of the other. Further, whenever the output shaft 80 is caused to revolve, the gears 183 are also caused to revolve in identical fashion and at the same speed, as an inspection of Figure 6 would seem to adequately demonstrate.

The eccentric cam journals 186 and 188, integral with said facsimile gears, support the front and rear reverse gears 179 and 181, which gears are so to speak harnessed in a dual effort to effectuate two phenomenal movements simultaneously. Thus, as the eccentric hubs 194 and 196, which are integral with said gears, effect the sinusoidal out of phase reciprocations of the shuttle monitors, said gears 179 and 181 simultaneously roll around the eccentrically disposed gears 207 and 215 respectively, of the cluster unit 220. Although the circular pitch line relation of gears 179 and gear 207, and the circular pitch line relation of gears 181 and gear 215 are tangential, the points of tangency are not concentric with the central axis of the mechanism, as an inspection of Figure 5 will substantiate.

Stated otherwise, as the casing 26 revolves, the gears 179 are obviously carried bodily along an orbit which is eccentric to the orbit along which the gears 181 are carried, so that although the resultant torque forces would seem to counteract each other for providing balance, the said gears 183 insure such action. Thus, each gear 183 individually, and the four gears 183 collectively, function in what may be termed a catalytic capacity for so blending and synchronizing the diverse stresses and torque forces as to eliminate, or at least reduce to a negligible minimum, any vibratory tendencies which the mechanism may develop in the course of attaining the objectives of the invention. Because each of the gears 183 is in meshed engagement with two of the idler gears 174, and these latter in turn are each in meshed engagement with the sun gear 202, an inter-relation obtains whereby the gears 183 so position their integral eccentric cams 186 and 188 along the orbits which the gears 179 and 181 travel, that the precise pitch line tangency previously referred to is maintained.

In view of the foregoing description augmented by an inspection of the drawings, it should be evident that the instant invention provides a novel mechanism adapted to attain its objectives in a highly efficient manner.

What I claim is:

1. In a rotatably supported mechanism of the character described: a cylindrical casing including spaced front and rear walls; coaxial drive and driven shafts each having a splined end portion extending into the casing, said end portions being contiguously disposed on the central axis of the casing; an internally splined central opening in the front wall rigid with the splined end portion of the drive shaft, whereby the casing is rotatable in unison with said drive shaft; an internally splined cluster gear unit including a sun gear, a front eccentric gear having a rearwardly projecting circular hub portion, and a rear eccentric gear having a forwardly projecting circular hub portion rigid with the splined end portion of the driven shaft, whereby said driven shaft is rotatable in unison with said unit, said eccentric gears being diametrically oppositely disposed relatively to said sun gear; circularly spaced double cross units of gearing rotatably supported within the casing, each double cross unit including a facsimile gear, a front reverse gear in mesh with said front eccentric gear, and a rear reverse gear in mesh with said rear eccentric gear, each reverse gear being rotatably mounted on one of a pair of diametrically opposite eccentric circular cam portions integral with the facsimile gear aforesaid, and each reverse gear including an integral eccentric hub portion projecting laterally therefrom toward said facsimile gear; idler gears rotatably supported within the casing, each idler gear being simultaneously in mesh with said sun gear and with a pair of facsimile gears; a front plate element provided centrally with an elongated opening disposed about said rearwardly projecting circular hub portion of the front eccentric gear, and having formed therein circularly spaced openings each snugly surrounding an eccentric hub portion of one of the front reverse gears aforesaid, whereby rotations of said front reverse gears effect reciprocatory sinusoidal movements of the front plate element; a rear plate element provided centrally with an elongated opening disposed about said forwardly projecting circular hub portion of the rear eccentric gear, and having formed therein circularly spaced openings each snugly surrounding an eccentric hub portion of one of the rear reverse gears aforesaid, whereby rotations of said rear reverse gears effect reciprocatory sinusoidal movements of the rear plate element, the movements of said front and rear plate being one hundred and eighty degrees out of phase; and a manually operable control assembly for hydraulically regulating the reciprocatory movements of the plate elements aforesaid, in consequence whereof during each revolution of the drive shaft and the casing rigid therewith, when the movements of said plate elements are unrestricted, the intermeshed facsimile and idler gears roll about the periphery of the sun gear without transmitting any motion thereto, and the front and rear reverse gears roll about the peripheries of the front and rear eccentric gears respectively without transmitting any motion thereto, the mechanism thus being in a clutch disengaged status.

2. In a rotatably supported mechanism of the character described: a cylindrical casing including spaced front and rear walls; coaxial drive and driven shafts each having a splined end portion extending into the casing, said end portions being contiguously disposed on the central axis of the casing; an internally splined central opening in the front wall rigid with the splined end portion of the drive shaft, whereby the casing is rotatable in unison with said drive shaft; an internally splined cluster gear unit including a sun gear, a front eccentric gear having a rearwardly projecting circular hub portion, and a rear eccentric gear having a forwardly projecting circular hub portion rigid with the splined end portion of the driven shaft, whereby said driven shaft is rotatable in unison with said unit, said eccentric gears being diametrically oppositely disposed relatively to said sun gear; circularly spaced double cross units of gearing rotatably supported within the casing, each double cross unit including a facsimile gear, a front reverse gear in mesh with said front eccentric gear, and a rear reverse gear in mesh with said rear eccentric gear, each reverse gear being rotatably mounted on one of a pair of diametrically opposite eccentric circular cam portions integral with the facsimile gear aforesaid, and each reverse gear including an integral eccentric hub portion projecting laterally therefrom toward said facsimile gear; idler gears rotatably supported within the casing, each idler gear being simultaneously in mesh with said sun gear and with a pair of facsimile gears; a front plate element provided centrally with an elongated opening disposed about said rearwardly projecting circular hub portion of the front eccentric gear, and having formed therein circularly spaced openings each snugly surrounding an eccentric hub portion of one of the front reverse gears aforesaid, whereby rotations of said front reverse gears effect reciprocatory sinusoidal movements of the front plate element; a rear plate element provided centrally with an elongated opening disposed about said forwardly projecting circular hub portion of the rear eccentric gear, and having formed therein circularly spaced openings each snugly surrounding an eccentric hub portion of one of the rear reverse gears aforesaid, whereby rotations of said rear reverse gears effect reciprocatory sinusoidal movements of the rear plate element, the movements of said front and rear plates being one hundred and eighty degrees out of phase; and a manually operable control assembly for hydraulically regulating the reciprocatory movements of the plate elements aforesaid, in consequence whereof during each revolution of the drive shaft and the casing rigid therewith, when the movements of said plate elements are restricted to a degree, the intermeshed facsimile and idler gears in rolling about the periphery of the sun gear transmit thereto via tooth engagement pressures a rotative force measured by the degree of restriction applied to said plate elements, and simultaneously, the front and rear reverse gears in revolving about the peripheries of the front and rear eccentric gears respectively transmit thereto via tooth engagement pressures a rotative force corresponding to that transmitted to the sun gear by said facsimile and idler gears, the mechanism thus being in a clutch engaged variable reduced speed transmission status.

3. In a rotatably supported mechanism of the character described: a cylindrical casing including spaced front and rear walls; coaxial drive and driven shafts each having a splined end portion extending into the casing, said end portions being contiguously disposed on the central axis of the casing; an internally splined central opening in the front wall rigid with the splined end portion of the drive shaft, whereby the casing is rotatable in unison with said drive shaft; an internally splined cluster gear unit including a sun gear, a front eccentric gear having a rearwardly projecting circular hub portion, and a rear eccentric gear having a forwardly projecting circular hub portion rigid with the splined end portion of the driven shaft, whereby said driven shaft is rotatable in unison with said unit, said eccentric gears being diametrically oppositely disposed relatively to said sun gear; circularly spaced double cross units of gearing rotatably supported within the casing, each double cross unit including a facsimile gear, a front reverse gear in mesh with said front eccentric gear, and a rear reverse gear in mesh with said rear eccentric gear, each reverse gear being rotatably mounted on one of a pair of diametrically opposite eccentric circular cam portions integral with the facsimile gear aforesaid, and each reverse gear including an integral eccentric hub portion projecting laterally therefrom toward said facsimile gear; idler gears rotatably supported within the casing, each idler gear being simultaneously in mesh with said sun gear and with a pair of facsimile gears; a front plate element provided centrally with an elongated opening disposed about said rearwardly projecting circular hub portion of the front eccentric gear, and having formed therein circularly spaced openings each snugly surrounding an eccentric hub portion of one of the front reverse gears aforesaid, whereby rotations of said front reverse gears effect reciprocatory sinusoidal movements of the front plate element; a rear plate element provided centrally with an elongated opening disposed about said forwardly projecting circular hub portion of the rear eccentric gear, and having formed therein circularly spaced openings each snugly surrounding an eccentric hub portion of one of the rear reverse gears aforesaid, whereby rotations of said rear reverse gears effect reciprocatory sinusoidal movements of the rear plate element, the movements of said front and rear plates being one hundred and eighty degrees out of phase, and a manually operable control assembly for hydraulically regulating the reciprocatory movements of the plate elements aforesaid, in consequence whereof during each revolution of the drive shaft and the casing rigid therewith, when the movements of said plate elements are entirely restricted, the facsimile gears, the idler gears, and the front and rear reverse gears have orbital travel only concurrent with said casing and drive shaft so that the sun gear, the eccentric gears, and the driven shaft rigid therewith are caused to revolve in unison with the casing and drive shaft, the mechanism thus being in a direct drive status.

4. In a rotatably supported mechanism of the character described: the construction set forth in claim 3 wherein the recited sun gear, idler gears, and facsimile gears are all of the same diameter and have an identical number of teeth formed along their peripheries; and wherein the recited front and rear eccentric gears and the front and rear reverse gears are all of the same diameter and have an identical number of teeth formed along their peripheries.

References Cited in the file of this patent
UNITED STATES PATENTS

| | | |
|---|---|---|
| 1,260,243 | Moore | Mar. 19, 1918 |
| 1,670,518 | Parker | May 22, 1928 |
| 1,765,948 | Sheridan | June 24, 1930 |
| 1,983,804 | Mathys-Muller | Dec. 11, 1934 |
| 2,243,652 | Reed | May 27, 1941 |
| 2,442,999 | Ekleberry | June 8, 1948 |
| 2,552,010 | Marsell | May 8, 1951 |
| 2,590,305 | Foster | Mar. 25, 1952 |